July 1, 1924.
L. E. ATWELL ET AL
SHOCK ABSORBER
Filed Aug. 4, 1923
1,500,044
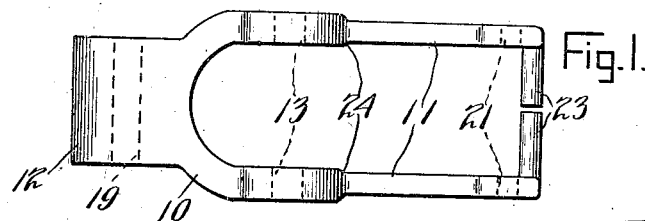
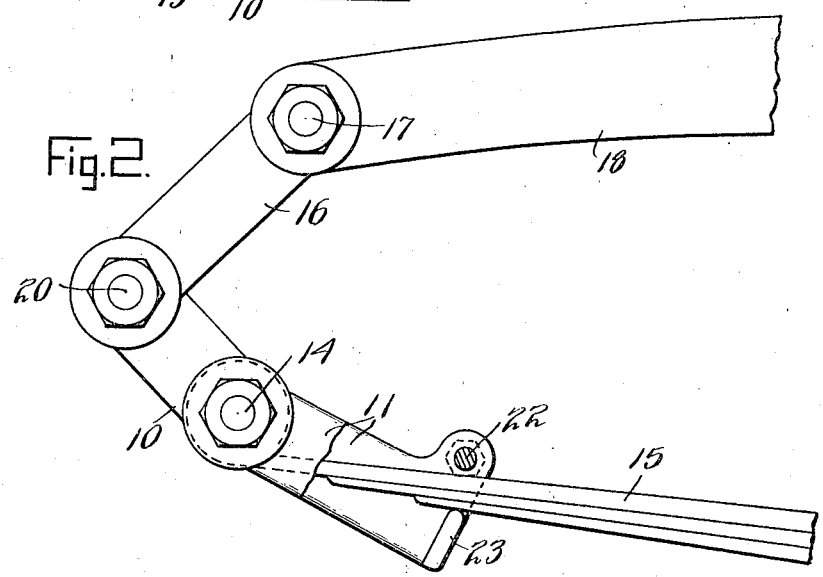
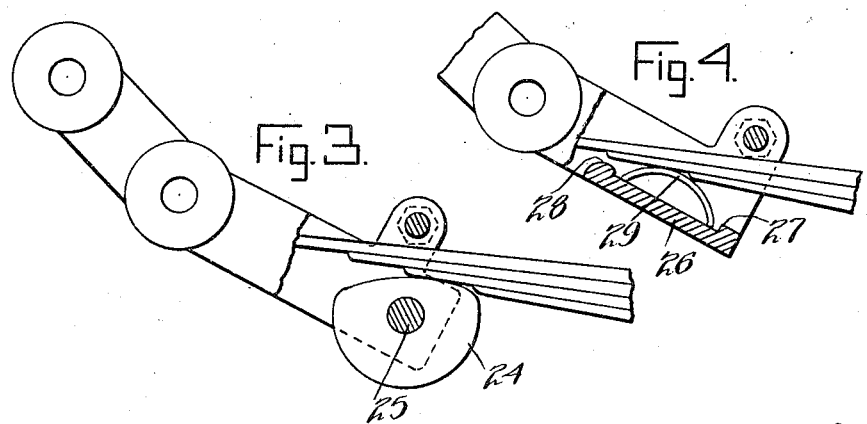
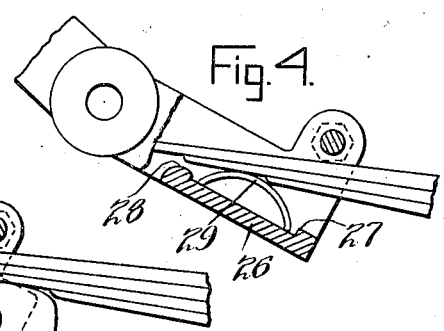
Inventors
Lewis E. Atwell
James Grant
Curtis E. White
By
Attorney Patented July 1, 1924.

1,500,044

UNITED STATES PATENT OFFICE.

LEWIS E. ATWELL, JAMES GRANT, AND CURTIS E. WHITE, OF JACKSONVILLE, FLORIDA.

SHOCK ABSORBER.

Application filed August 4, 1923. Serial No. 655,659.

*To all whom it may concern:*

Be it known that we, LEWIS E. ATWELL, JAMES GRANT, and CURTIS E. WHITE, citizens of the United States, residing at Jacksonville, in the county of Duval and State of Florida, have invented certain new and useful Improvements in Shock Absorbers, of which the following is a specification.

Our said invention relates to a shock absorber for vehicles and it is an object of the invention to provide a very simple and effective structure of the character described which acts to absorb the shock and control the rebound which immediately follows it in passing over rough surfaces such as railroad crossings, street car crossings, etc. This device also maintains an even balance of the car in traveling over rough roads and saves the tires by eliminating the possibility of the wheels leaving the ground when passing over a severe depression or a large obstruction.

A further object of the invention is to provide a device of the character described which can be quickly and easily installed by unskilled labor.

Another object of the invention is to provide a shock absorber which is applicable to any car having full elliptic, three-quarter elliptic or cantilever springs supporting the body.

Referring to the accompanying drawings, which are made a part hereof and on which similar reference characters indicate similar parts, Figure 1 is a plan of our device in a preferred form, Figure 2, an elevation of part of an automobile equipped with the same, Figure 3, a similar view showing a modified form, and Figure 4, still another modification.

In the drawings reference character 10 indicates a lever having the general form of a yoke with a pair of arms 11 springing from one side of an arch and a single arm 12 springing from the other side. Near the yoke there are a pair of holes 13 to receive a bolt 14 at the end of a vehicle spring 15. This may be the same bolt that normally secures the spring to the shackle 16 which at its upper end is pivoted by a bolt 17 to a part 18 of the vehicle body.

The rear arm 12 is perforated at 19 to receive a bolt 20 pivotally connecting the lever to the shackle 16. Near the forward end the arms 11 are perforated at 21 to receive a rebound bolt 22 located above the spring and adapted to engage the upper face of the spring to check the rebound after a shock such as is caused by striking an obstruction in the road.

Underneath the spring 15 the lever is provided with a pair of projections 23 springing from opposite arms and extending toward one another. If preferred these projections may be united to form a continuous bar extending underneath the spring and resting against the same. We prefer, however, to reduce the thickness of the arms 11 slightly as clearly shown at 24 to provide a clearance for the end of the spring. In applying the device of our invention to a vehicle, the nut on bolt 22 may be tightened so as to cause the projections 23 to approach or even to contact with one another if sufficient space remains at the sides of the spring. This adjustment enables us to take up all side play between the lever and the vehicle spring.

It may be noted that the distance from the center point of the bolt 14 to the center of bolt 20 is one-half the distance from the bolt 14 to the point of contact of projections 23 with the underside of the spring giving a two to one leverage with the longer leverage on the spring side of the cushion thereby relieving to a considerable extent the strain on the shackles.

In the modified form of Figure 3 we have replaced the projections 23 by a bolt 25 supporting an elliptical roller 29. This provides a wider bearing against the spring than is true where the projection 23 is used. In the modified form of Figure 4 a web 26 is formed across the lower end of the lever, this web having a pair of upstanding lugs 27 and 28. A bowed spring 29 rests at its ends on the face of the web between said lugs, the length of the spring being such that it normally is out of contact with one or both of the lugs but under conditions of shock or excessive pressure may be straightened somewhat and so cushion the shock.

In addition to the modifications discussed others will occur to those skilled in the art and therefore we do not limit ourselves to what is shown in the drawings and described in the specification but only as indicated in the appended claims.

Having thus fully described our said invention, what we claim as new and desire to secure by Letters Patent, is:

1. In a shock absorber for vehicles, a spring having a bearing at one end, a yoke-like lever embracing an end of the spring and spaced therefrom at the sides, a pivot bolt passing through the lever and the bearing, spaced abutments on the lever engaging the one face of the spring, a bolt connecting said ends adapted to engage the opposite face of the spring, and means to connect the other end of the lever to the vehicle frame, substantially as set forth.

2. In a shock absorber for vehicles, a spring having a bearing at one end, a yoke-like lever embracing an end of the spring and spaced therefrom at the sides, a pivot bolt passing through the lever and the bearing, spaced abutments on the lever engaging the under face of the spring, a bolt connecting said ends adapted to engage the upper face of the spring to check the rebound, and means to connect the other end of the lever to the vehicle frame, substantially as set forth.

In witness whereof, we have hereunto set our hands and seals at Jacksonville, Florida, this 2nd day of Aug., A. D. nineteen hundred and twenty-three.

LEWIS E. ATWELL. [L. S.]
JAMES GRANT. [L. S.]
CURTIS E. WHITE. [L. S.]

Witnesses:
Wm. L. Christie,
Gladys Cox.